United States Patent [19]

Hunt

[11] 4,164,533

[45] Aug. 14, 1979

[54] CARBON BLACK PELLET AND METHOD AND APPARATUS FOR PRODUCING SAME

[75] Inventor: Harold R. Hunt, Bartlesville, Okla.

[73] Assignee: Phillips Petroleum Company, Bartlesville, Okla.

[21] Appl. No.: 853,715

[22] Filed: Nov. 21, 1977

[51] Int. Cl.$^2$ .............................................. B01J 2/12
[52] U.S. Cl. .................................................. 264/117
[58] Field of Search ......................................... 264/117

[56] References Cited

U.S. PATENT DOCUMENTS

| 3,676,168 | 7/1972 | Dollinger | 106/307 |
| 3,956,445 | 5/1976 | Hunt | 264/117 |

Primary Examiner—Robert F. White
Assistant Examiner—James R. Hall

[57] ABSTRACT

A carbon black pellet formed by the pelleting of flocculent carbon black. An outer portion of the pellet contains antioxidant to prevent oxidation of the pellet during drying. The antioxidant is contained in a shell having a thickness sufficient to prevent oxidation of the pellet instead of being distributed throughout the thickness of the pellet. The antioxidant can be admixed with additional carbon black and the admixture used to form the outer layer of a layered pellet or the antioxidant can be mixed with the pelleting liquid used to aid in pelleting the additional carbon black used to form an outer layer of a layered pellet.

12 Claims, 2 Drawing Figures

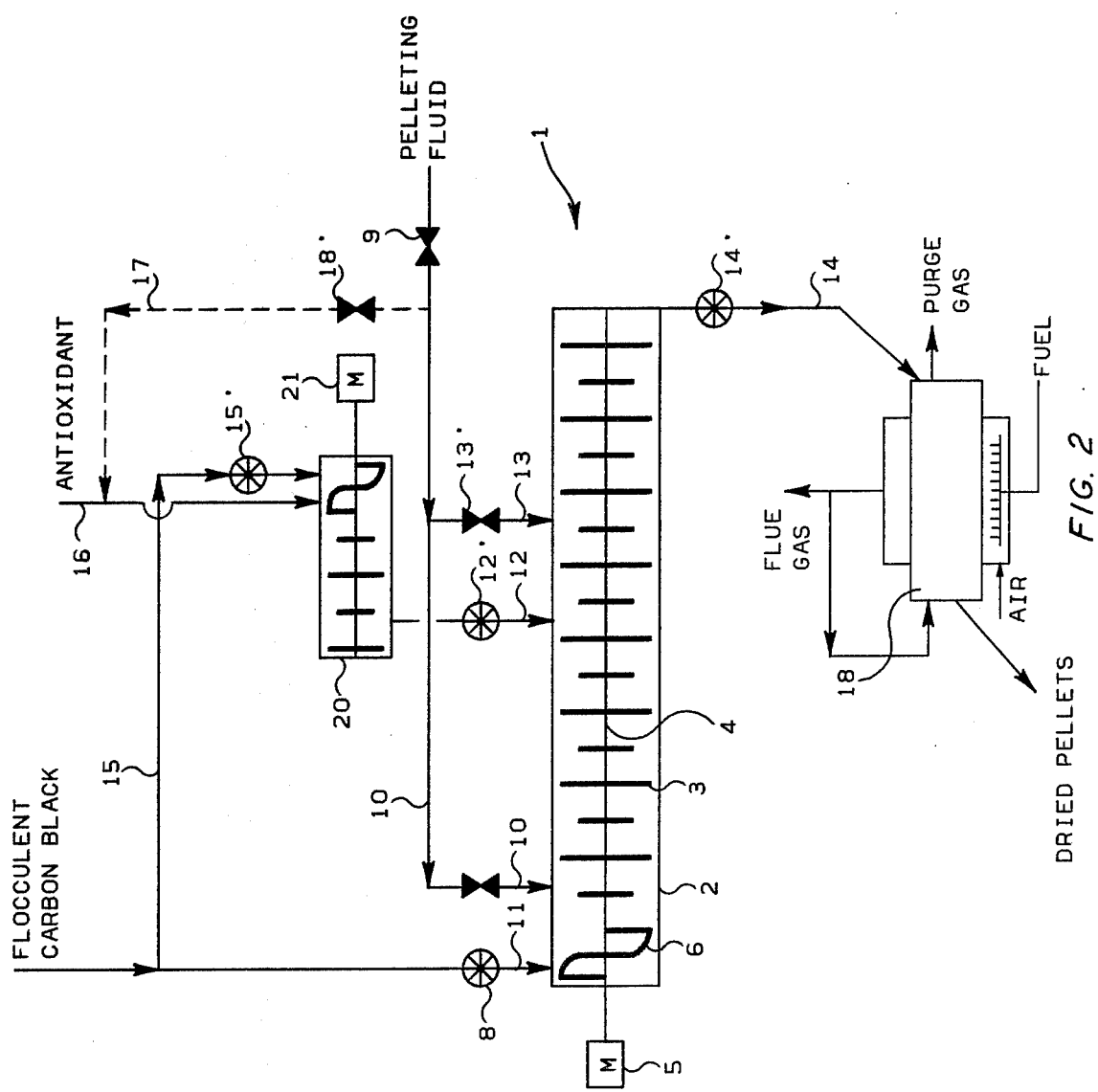

CARBON BLACK PELLET AND METHOD AND APPARATUS FOR PRODUCING SAME

The present invention relates to a method of producing a carbon black pellet containing antioxidant in an outer layer or shell thereof.

When forming pellets of flocculent carbon black, the carbon black particles are first wetted with a liquid such as water to aid in forming the pellets. The wetted carbon black particles are mixed in a pelleter and the mixing results in the agglomeration of the carbon black particles to form carbon black pellets. The formed pellets are then conveyed to a dryer to evaporate the pelleting liquid. During drying, oxidation of the pellets can result because the drying takes place in an oxidizing atmosphere (hot combustion gases containing free $O_2$). It has been the practice in the past to add an antioxidant to all the flocculent carbon black before pelleting or during the pelleting operation, or to the pelleting liquid, to prevent oxidation of the formed pellets during drying. By admixing the antioxidant with the flocculent carbon black before pelleting, or during pelleting, or with the pelleting liquid, the antioxidant is contained within the pellet throughout the entire volume thereof. It has been found that oxidation is primarily a surface or minor subsurface or shell portion phenomena and that the antioxidant is not needed throughout the entire volume of the pellet to prevent oxidation.

It is also desirable in certain pelleting processes to form a pellet having a plurality of layers. This can be accomplished, as disclosed in U.S. Pat. No. 3,956,445, issued May 11, 1976, by forming a partial pellet and then contacting the surface of the partially formed pellet with additional flocculent carbon black and pelleting liquid to form one or more subsequent layers of carbon black. To effect layering of the pellets, an aqueous pelleting liquid and flocculent carbon black can be mixed in a weight ratio of about 1 to 2. The resulting mixture can then be agitated, such as in a pelleter or pellet mill to form the pellet cores. Additional flocculent carbon black can be added to the pelleter in a series of increments and additional pelleting liquid can be added. By controlling the relative amounts of flocculent carbon black and pelleting liquid and the time of addition of the increments of flocculent carbon black, a layered pellet can be formed. Such layered pellets usually have greater density and a more uniform size than non-layered pellets. Layered pellets are often preferred because they are easy to compound into rubber and have a good size distribution.

The present invention provides an improved pellet which incorporates antioxidant on the surface and a subsurface shell portion of the pellet thereby resulting in a savings of antioxidant which is used to prevent oxidation of the pellet during drying.

An object of the present invention is to provide a method of producing a carbon black pellet having antioxidant only on the surface and in a minor subsurface portion or shell of the pellet. Another object of the invention is to provide such a method which is adapted for use with a layered carbon black pellet. A still further object of the invention is to provide a carbon black pellet having antioxidant only on the surface and in a minor subsurface portion or shell of the pellet. A still further object of the invention is to provide a process and carbon black pellet which are well adapted for their intended use.

Other objects and advantages of the present invention will become apparent from the following detailed description taken in connection with the accompanying drawings wherein are set forth by way of illustration and example, certain embodiments of this invention.

FIG. 2 is a schematic illustration of an apparatus used in another embodiment of a method for forming carbon black pellets.

Figure 1:
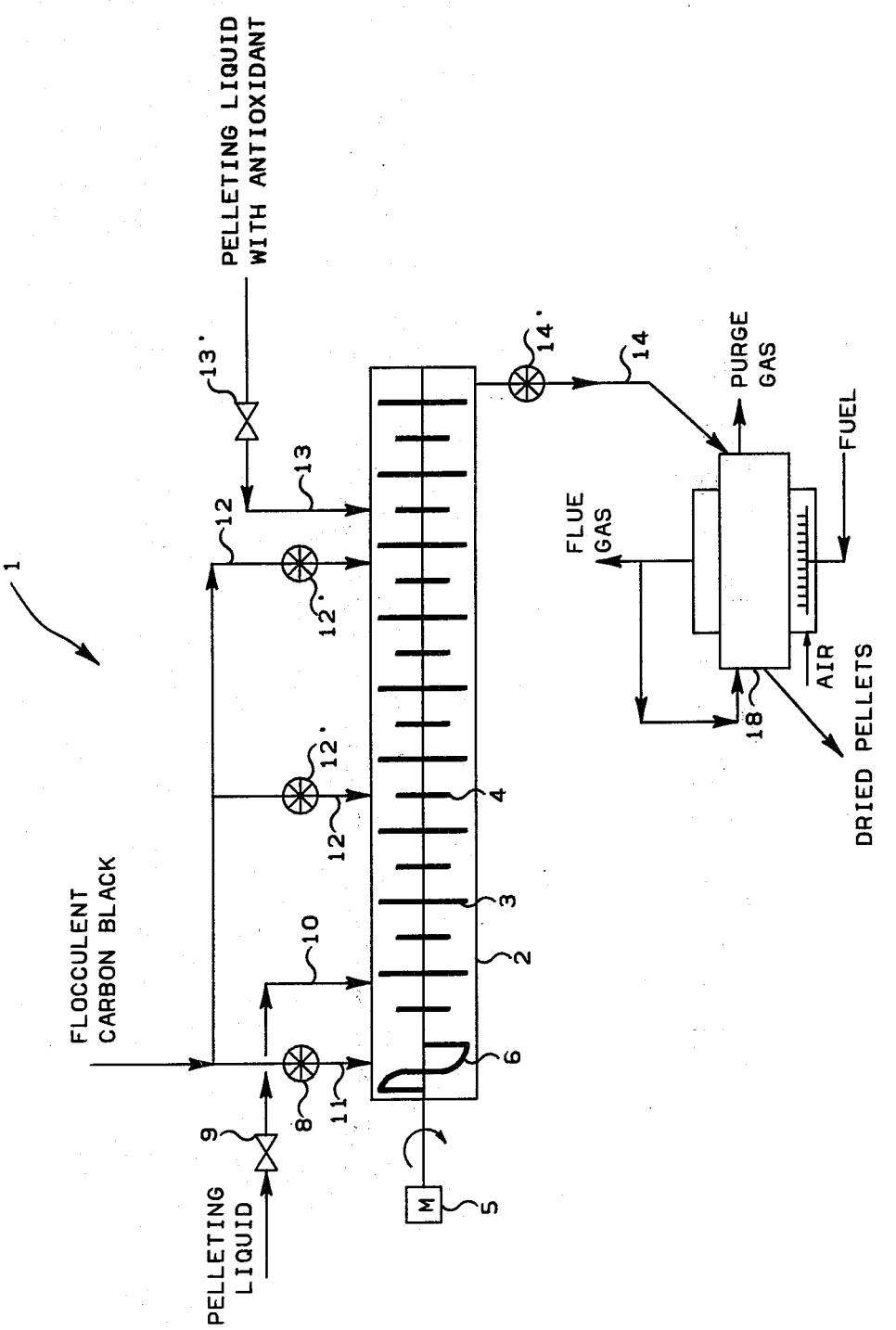
FIG. 1 is a schematic illustration of an apparatus used for forming carbon black pellets which embodies one form of the present invention.

Referring to FIG. 1, the reference numeral 1 designates generally an apparatus for producing carbon black pellets. The apparatus 1 includes a pelleter or pellet mill 2 of any suitable type such as that disclosed in U.S. Patent No. 3,956,445. A plurality of mixing pins 3 are secured to an elongate shaft 4 which extends longitudinally along the length of the pelleter 2. The shaft 4 is rotated by drive means such as a motor 5. A feed screw 6 can also be secured to the shaft 4 at an inlet end of the pelleter 2. Positioned at the upstream or inlet end of the pelleter 2 is a pelleting liquid inlet conduit means 10 which is adapted for introducing a pelleting liquid such as water and/or other pelleting aids such as lignosulfonates, molasses or the like. The flow rate of the pelleting liquid is controlled by a valve 9.

There is also provided adjacent the upstream or inlet end of the pelleter 2 a flocculent carbon black inlet conduit means 11 which preferably opens into the pelleter 2 at a position between the upstream end of the pelleter 2 and the inlet conduit means 10. The inlet conduit means 11 is operable for introducing flocculent or loose carbon black particles into the pelleter 2. A valve 8 can be provided in the inlet conduit means 11 to control the input rate of flocculent carbon black. Positioned between the inlet conduit means 11 and the downstream end of the pelleter 2, there can be provided a plurality of additional flocculent carbon black inlet conduit means 12 for introducing flocculent carbon black at various positions along the length of the pelleter 2 if it is desired to form a layered pellet. These inlets can also include valves 12' to control the input rate of flocculent carbon black at their respective positions.

In the form of pelleter 2 shown in FIG. 1, pelleting liquid is added to the pelleter 2 at a position preferably adjacent the discharge end of the pelleter 2. An inlet conduit means 13 is provided which opens into the pelleter 2 preferably downstream of the last inlet conduit means 12 and is adapted for introducing a pelleting liquid into the pelleter 2. In a preferred form of the present invention, the pelleting liquid introduced through the inlet conduit means 13 has an antioxidant mixed therewith in a quantity so as to permeate the surface and a subsurface portion of the pellets contained within the pelleter 2. Any suitable antioxidant can be used, for example, para-substituted-2,6-ditertiary butylphenols, e.g., 4-substituted-2,6-ditertiary butylphenols as disclosed in U.S. Pat. No. 3,676,168. A flow control valve 13' is provided in the inlet conduit means 13 to control the flow rate of the liquid introduced into the pelleter 2 through the inlet conduit means 13. Carbon black pellets generally have a diameter of between about 125 $\mu$m (micrometers) (0.005 in.) and about 2,000 $\mu$m (0.08 in.) and preferably between about 250 $\mu$m (0.01 in.) and about 1000 $\mu$m (0.04 in.). Preferably the pellets are layered and the antioxidant is contained within the pellet in a surface and subsurface portion such as in one or more layers. The antioxidant is contained in the pellet to a depth from the surface sufficient to prevent oxidation, i.e., about 0.5 percent to about 8 percent of the pellet thickness (diameter) and preferably to a depth of up to about 0.002 inches. The pelleting liquid introduced via the inlet conduit means 10 generally is about 35 percent to about 150 percent by weight of the flocculent carbon black introduced via the inlet conduit means 11 and 12. The pelleting liquid added via the inlet conduit means 13 is preferably between about 1 percent and about 25 percent by weight of the wet carbon black pellets at the inlet conduits means 13. Preferably, the antioxidant is in an amount of about 0.002 to about 2 weight percent, preferably about 0.01 to about 1 weight percent, of the dried carbon black pellets, or about 0.02 to about 15 weight percent, preferably about 0.1 to about 5 weight percent, of liquid added via inlet conduit means 13. The core of the pellets has substantially no antioxidant.

The above-described method can be used to coat a non-layered pellet with antioxidant to the desired thickness if additional flocculent carbon black is not added with a liquid carrier, such as water, via inlet conduit means 13 during mixing and after pellets are formed such that the desired antioxidant containing shell is formed by the impregnation of the existing pellet by the antioxidant.

The formed carbon black pellets are discharged via a discharge 14 from the pelleter 2. The rate of discharge of the pellets can be controlled by a suitable valve 14'. The pellets discharged generally will have a moisture content of about 35 percent to 65 percent by weight of the wet carbon black pellets and should be dried. The discharged pellets are conveyed to a dryer 18 such as that disclosed in U.S. Pat. No. 3,102,005, issued Aug. 27, 1963, for drying the carbon black pellets preferably to a moisture content of less than about 0.5% by weight of the dried carbon black pellets. The following is a calculated example illustrating the form of the invention shown in FIG. 1.

| Calculated Example | | |
|---|---|---|
| Pelleter (2) Description | Ranges | Specific |
| Length, feet | — | 20 |
| Diameter, feet | — | 2 |
| Speed of Shaft, RPM, | 250 to 650 | 400 |
| Temperature, °F. | 40 to 200 | 150 |
| Helical pins on the shaft, double helix of conventional type as in U.S. 3,674,437 | | |
| Charge Materials | | |
| (10) Pelleting Water[a], lbs./hr., | — | 3,500 |
| (11) Carbon black, lbs./hr., | — | 3,000 |
| (12) Carbon black, lbs./hr., | — | 1,000 |
| (13) Antioxidant - Water, lbs.hr., (0.16 wt. % antioxidant) | — | 500 |
| Weight Ratio CB 11/Water 10, | 0.65:1 to 2-1 | 0.86 to 1 |
| Weight Ratio CB 12/CB 11, | 0.05:1 to 0.5:1 | 0.33 to 1 |
| Weight Ratio Fluid 13/Water 10, | 0.05:1 to 0.5:1 | 0.14 to 1 |
| Wt. % Antioxidant (in CB 12)[b] | 0.05 to 5 | 0.08 |
| Wet Pellet Product: | | |
| Weight % Carbon Black, in finished pellets | 39 to 67 | 50 |
| Weight % Water, in finished pellets | 61 to 63 | 50 |
| Weight % Antioxidant,[b] in Carbon Black Shell (based on carbon black in the shell) | 0.05 to 5 | 0.08 |
| Weight % Antioxidant based on Total Black | 0.002 to 2.0 | 0.02 |
| Total Wt. Ratio All CB/All Fluid | 0.65:1 to 2:1 | 1:1 |
| Dried Pellet Product: | | |

-continued

| Calculated Example | | |
|---|---|---|
| Pelleter (2) Description | Ranges | Specific |
| Weight % Carbon Black | — | 99.5 |
| Weight % Water | — | 0.5 |
| Weight % Additive[b] on Total Black | — | 0.02 |

[a] Can contain other conventionally used pelleting aids such as molasses, lignosulfonates, etc.
[b] Antioxidant is detailed in U.S. 3,676,168.

Referring to FIG. 2. A second embodiment of the invention is illustrated in FIG. 2 wherein the reference numerals indicate like parts or structure as the same reference numerals indicate in the form of the invention illustrated in FIG. 1. The pelleter 2 has a plurality of mixing pins 3 mounted on a shaft 4. A feed screw 6 is also mounted on the shaft 4 and driven by the motor 5. Flocculent carbon black is introduced via the inlet 11 and the pelleting liquid is introduced via the inlet conduit means 10 and 13. In the form shown, flocculent carbon black is fed to a mixer 20 via a conduit or conveyor 15. Antioxidant is introduced into the mixer 20 via an inlet conduit means 16. The flocculent carbon black and antioxidant are admixed in the mixer 20 and then discharged into the pelleter 2 via the inlet conduit means 12. The mixer 20 can be powered by a motor 21 and can be of any suitable type. Some of the pelleting liquid can be introduced into conduit means 16 and, hence, the mixer 20 as by a conduit means 17 with the flow of the pelleting liquid via the conduit means 17 being controlled by a valve 18'. The major portion of pelleting liquid is added to the pelleter 2 via inlet conduit means 10 and 13. The finished pellets are discharged from the pelleter 2 via the discharge 14 to the dryer 18 for drying.

To illustrate operation of the form of the invention shown in FIG. 2, the following calculated example is provided.

| Calculated Example | | |
|---|---|---|
| | Ranges | Specific |
| Mixer Unit (Pin Mixer) (20): | | |
| Length, feet, | — | 6 |
| Diameter, feet, | — | 2 |
| Speed of Shaft, RPM | 200–500 | 250 |
| Temperature, F., | 40–200 | 150 |
| Pelleting Water[a], Lb/Hr. (added at 10) | — | 3,500 |
| Carbon Black, Lb/Hr. (Charged at 11) | — | 3,000 |
| Carbon Black, Lb/Hr (charged at 15) | — | |
| Pelleting Water[a], Lb/Hr. (added at 13) | — | 500[b] |
| Antioxidant Lb/Hr. | — | 0.8 |
| Carbon Black (0.08 wt. % antioxidant), Lb/Hr. (charged at 12) | — | 1000.8 |
| Wet Pellets, Lb/Hr. (discharged at 14) | — | 8000.8 |
| Dried Pellets, Lb/Hr, | — | 4020 |
| Wt. % liquid, | 0.2 to 1.0 | 0.5 |
| Wt. % antioxidant in shell, | 0.05 to 5 | 0.08 |
| Wt. % antioxidant based on total black, | 0.002 to 2.0 | 0.02 |
| Wt. Ratio CB (11)/Water (10, | 0.65:1 to 2:1 | 0.86:1 |
| Wt. Ratio CB (15)/CB (11), | 0.05:1 to 0.5:1 | 0.33:1 |
| Wt. Ratio Water (13)/Water (10), | 0.05:1 to 0.5:1 | 0.14:1 |
| Wt. % Antioxidant in CB (12), | 0.05 to 5 | 0.08 |
| Total Wt. Ratio all CB/all fluid, | 0.65:1 to 2:1 | 1:1 |

-continued

| | Calculated Example | |
|---|---|---|
| | Ranges | Specific |
| Wt. Ratio Water (17)/CB (15) | 0:1 to 0.25:1 | 0 |

[a] Can contain conventional pelleting aids such as molasses, lignosulfonates, and the like.
[b] Some pelleting fluid can pass via 17 to antioxidant (16) to admix therewith, but in an amount so that no pelleting occurs in (20); usually less than 25 wt. % of the carbon black added at (15), and the amount of pelleting liquid is less than 20 weight percent of the carbon black in mixer 20.

It is to be understood that while there has been illustrated and described certain forms of this invention, it is not to be limited to the specific form or arrangement of parts or steps herein described and shown except to the extent that such limitations are found in the claims.

What is claimed and desired to be secured by Letters Patent is:

1. A method for producing carbon black pellets comprising:
    (a) wetting flocculent carbon black with a pelleting liquid in a pelleting means;
    (b) agitating the thus wetted flocculent carbon black in the pelleting means to form pellets;
    (c) adding antioxidant during the agitating of step (b) after the pellets have been at least substantially formed so that the antioxidant is contained substantially only in an outer portion of the pellet surrounding a core portion; and
    (d) drying the thus produced pellets containing said antioxidant.

2. A method as set forth in claim 1 wherein:
    (e) first forming, in steps (a) and (b), said core portion as a pre-pellet core; and including
    (f) adding flocculent carbon black after the pre-pellet cores are formed and mixing the additional flocculent carbon black with the thus formed pre-pellet cores to form a shell coating of additional flocculent carbon black on the thus formed pre-pellet cores;
    (g) adding additional pelleting liquid for wetting the additional flocculent carbon black to aid in cohesion of the additional flocculent carbon black to the thus formed pre-pellet cores to form the shell coating; and wherein
    (h) said antioxidant added in step (c) is added with the additional flocculent carbon black or with the additional pelleting liquid.

3. A method as set forth in claim 2 wherein:
    said antioxidant added in step (c) is added with said additional pelleting liquid.

4. A method as set forth in claim 3 wherein:
    said antioxidant is added in an amount such that the pellets contain between about 0.002 percent and about 2 percent antioxidant by weight of the dried carbon black pellets.

5. A method as set forth in claim 4 wherein:
    said additional pelleting liquid added in step (g) is added in an amount of between about 1 percent and about 25 percent by weight of the flocculent carbon black and additional flocculent carbon black.

6. A method as set forth in claim 5 wherein:
    said additional pelleting liquid includes about 0.02 percent to about 15 percent by weight antioxidant based on the combined weight of antioxidant and additional pelleting liquid.

7. A method as set forth in claim 6 wherein:
    the pellets are dried in step (d) to a moisture content of less than about 0.5 percent by weight based on the weight of the dried pellets.

8. A method as set forth in claim 2 wherein:
    said antioxidant is admixed with at least a portion of the additional flocculent carbon black before the additional flocculent carbon black is added to and mixed with the thus formed pre-pellet cores in step (f).

9. A method as set forth in claim 8 wherein:
    said antioxidant added in step (c) is added in an amount of between about 0.002 percent and about 2 percent by weight of the flocculent carbon black and additional flocculent carbon black.

10. A method as set forth in claim 9 wherein:
    said additional pelleting liquid added in step (g) is added in an amount of between about 1 and about 25 percent by weight of the flocculent carbon black and additional flocculent carbon black.

11. A method as set forth in claim 10 wherein in step (d), the pellets are dried to a moisture content of less than about 0.5 percent by weight.

12. A method as set forth in claim 1 wherein:
    said outer portion of the pellet has a depth from the surface of the pellet of about 0.5 percent to about 8 percent of the pellet diameter.

* * * * *